United States Patent
Kobayashi

(10) Patent No.: US 12,175,803 B2
(45) Date of Patent: Dec. 24, 2024

(54) INFORMATION PROCESSING DEVICE, INFORMATION PROCESSING METHOD, STORAGE MEDIUM, AND INFORMATION PROCESSING SYSTEM

(71) Applicant: TOYOTA JIDOSHA KABUSHIKI KAISHA, Aichi-ken (JP)

(72) Inventor: Jun Kobayashi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 370 days.

(21) Appl. No.: 17/544,939

(22) Filed: Dec. 8, 2021

(65) Prior Publication Data

US 2022/0207926 A1 Jun. 30, 2022

(30) Foreign Application Priority Data

Dec. 25, 2020 (JP) ................................ 2020-217794

(51) Int. Cl.
- *G07C 5/00* (2006.01)
- *B60W 40/08* (2012.01)
- *G07C 5/08* (2006.01)

(52) U.S. Cl.
CPC ............ *G07C 5/008* (2013.01); *B60W 40/08* (2013.01); *G07C 5/0816* (2013.01); *G07C 5/0841* (2013.01)

(58) Field of Classification Search
None
See application file for complete search history.

(56) References Cited

U.S. PATENT DOCUMENTS

| | | | |
|---|---|---|---|
| 2014/0036083 A1* | 2/2014 | Vau | B60R 1/00 348/148 |
| 2015/0127429 A1* | 5/2015 | Kim | G06Q 30/0283 705/7.35 |
| 2017/0270720 A1* | 9/2017 | Aydin | G05D 23/00 |
| 2017/0278194 A1* | 9/2017 | MacNeille | B60G 17/0185 |
| 2020/0193904 A1 | 6/2020 | Kho | |
| 2020/0349666 A1* | 11/2020 | Hodge | G01C 21/3602 |
| 2020/0402341 A1* | 12/2020 | Lutnick | G07F 17/3269 |
| 2020/0402391 A1* | 12/2020 | Dutta | G07C 5/008 |
| 2021/0016805 A1* | 1/2021 | Oba | A61B 5/18 |
| 2021/0229553 A1* | 7/2021 | Mori | G02B 27/0172 |
| 2022/0159432 A1* | 5/2022 | Crawford | H04W 4/48 |
| 2022/0227255 A1* | 7/2022 | Nishida | G07C 5/008 |
| 2022/0242316 A1* | 8/2022 | Hamano | G06V 10/96 |

FOREIGN PATENT DOCUMENTS

| | | |
|---|---|---|
| JP | 20002626 A | 1/2000 |
| JP | 201590703 A | 5/2015 |

* cited by examiner

*Primary Examiner* — Hunter B Lonsberry
*Assistant Examiner* — Robert Louis Pinkerton
(74) *Attorney, Agent, or Firm* — HAUPTMAN HAM, LLP

(57) ABSTRACT

An information processing device includes at least one processor. The processor communicates with a vehicle and receives deterioration information that is involved in deterioration of a part provided within a cabin of the vehicle; stores the received deterioration information; and estimates a deterioration degree of the part on the basis of the stored deterioration information.

19 Claims, 14 Drawing Sheets

DETERIORATION INFORMATION DATABASE 34A

| COMPONENT | DETERIORATION ITEM | INFORMATION IDENTIFICATION CODE | TOTAL SCORE | DETERIORATION LEVEL |
|---|---|---|---|---|
| SEAT 1 | DECREASE IN ELASTICITY | P 5 | 700 | 7 |
| | SUN BLEACHING | P 3 | 521 | 5 |
| | | P 4 | | |
| | ODOR PERMEATION | P 6 | 112.5 | 1 |
| | | P 7 | | |
| | | P 8 | | |
| | WEAR DUE TO USE | P 5 | 302 | 3 |
| | DIRTYING OR DAMAGE | P 7 | 46 | 1 |
| | | P 8 | | |
| | ... | ... | ... | ... |
| INSTRUMENT PANEL | SUN BLEACHING | ... | ... | ... |
| | ODOR PERMEATION | ... | ... | ... |
| | DIRTYING OR DAMAGE | ... | ... | ... |
| ... | ... | ... | ... | ... |

FIG.4

DETERIORATION INFORMATION TABLE                    24A

| COMPONENT | DETERIORATION INFORMATION | INFORMATION IDENTIFICATION CODE | DETERIORATION SCORE |
|---|---|---|---|
| SEAT 1 | TEMPERATURE INFORMATION | P 1 | 0.2 |
| SEAT 1 | HUMIDITY INFORMATION | P 2 | 0.3 |
| SEAT 1 | AMOUNT OF SUNLIGHT | P 3 | 1 |
| SEAT 1 | AMOUNT OF ULTRAVIOLET LIGHT | P 4 | 2 |
| SEAT 1 | SEATING INFORMATION | P 5 | 1 |
| SEAT 1 | SMOKING INFORMATION | P 6 | 1 |
| SEAT 1 | EATING/DRINKING INFORMATION | P 7 | 0.3 |
| SEAT 1 | PETS RIDING TOGETHER | P 8 | 1 |
| ... | ... | ... | ... |
| INSTRUMENT PANEL | TEMPERATURE INFORMATION | P m | ... |
| INSTRUMENT PANEL | HUMIDITY INFORMATION | ... | ... |
| INSTRUMENT PANEL | AMOUNT OF SUNLIGHT | ... | ... |
| INSTRUMENT PANEL | AMOUNT OF ULTRAVIOLET LIGHT | ... | ... |
| INSTRUMENT PANEL | SMOKING INFORMATION | ... | ... |
| ... | ... | ... | ... |
| DOOR SOUND ABSORBING MEMBER 1 | TEMPERATURE INFORMATION | P n | ... |
| DOOR SOUND ABSORBING MEMBER 1 | HUMIDITY INFORMATION | ... | ... |
| DOOR SOUND ABSORBING MEMBER 1 | AMOUNT OF SUNLIGHT | ... | ... |
| DOOR SOUND ABSORBING MEMBER 1 | AMOUNT OF ULTRAVIOLET LIGHT | ... | ... |
| DOOR SOUND ABSORBING MEMBER 1 | DOOR OPENING/CLOSING INFORMATION | ... | ... |
| ... | ... | ... | ... |
| INTERIOR LIGHTS | RUNNING TIME | ... | ... |
| AIR CONDITIONER | RUNNING TIME | ... | ... |
| AIRBAG 1 | TEMPERATURE INFORMATION | ... | ... |
| AIRBAG 1 | HUMIDITY INFORMATION | ... | ... |
| PRETENSIONER 1 | TEMPERATURE INFORMATION | ... | ... |
| PRETENSIONER 1 | HUMIDITY INFORMATION | ... | ... |
| SEATBELT 1 | BUCKLE USAGE INFORMATION | ... | ... |
| ... | ... | ... | ... |

FIG.5

CORRECTION INFORMATION TABLE                                    24B

| INFORMATION IDENTIFICATION CODE | CORRECTION INFORMATION | CORRECTION SCORE |
|---|---|---|
| P 5 | PHYSIQUE OF VEHICLE OCCUPANT IS LARGE | 0.5 |
| P 6 | WINDOW IS OPEN | -0.3 |
| P 6 | OUTSIDE AIR INTRODUCED-IN BY AIR CONDITIONER | -0.3 |
| P 7 | WINDOW IS OPEN | -0.1 |
| P 7 | OUTSIDE AIR INTRODUCED-IN BY AIR CONDITIONER | -0.1 |
| P 7 | VEHICLE OCCUPANT IS A CHILD | 0.1 |
| . . . | . . . | . . . |

FIG.8

DETERIORATION INFORMATION DATABASE 34A

| COMPONENT | DETERIORATION ITEM | INFORMATION IDENTIFICATION CODE | TOTAL SCORE | DETERIORATION LEVEL |
|---|---|---|---|---|
| SEAT 1 | DECREASE IN ELASTICITY | P 5 | 700 | 7 |
| | SUN BLEACHING | P 3 | 521 | 5 |
| | | P 4 | | |
| | ODOR PERMEATION | P 6 | 112.5 | 1 |
| | | P 7 | | |
| | | P 8 | | |
| | WEAR DUE TO USE | P 5 | 302 | 3 |
| | DIRTYING OR DAMAGE | P 7 | 46 | 1 |
| | | P 8 | | |
| | ... | ... | ... | ... |
| INSTRUMENT PANEL | SUN BLEACHING | ... | ... | ... |
| | | ... | ... | ... |
| | ODOR PERMEATION | ... | ... | ... |
| | | ... | ... | ... |
| | DIRTYING OR DAMAGE | ... | ... | ... |
| | | ... | ... | ... |
| ... | ... | ... | ... | ... |

FIG.9

DETERIORATION LEVEL TABLE  34B

| TOTAL SCORE | DETERIORATION LEVEL |
| --- | --- |
| 1000〜 | 10 |
| 900〜999.9 | 9 |
| 800〜899.9 | 8 |
| 700〜799.9 | 7 |
| 600〜699.9 | 6 |
| 500〜599.9 | 5 |
| 400〜499.9 | 4 |
| 300〜399.9 | 3 |
| 200〜299.9 | 2 |
| 0〜199.9 | 1 |

FIG.10

PER UTILIZATION MODE CORRECTION TABLE  34C

| MODE OF USE / VEHICLE FOR XXX ||||
|---|---|---|
| COMPONENT | DETERIORATION ITEM | TOTAL SCORE |
| SEAT 1 | DECREASE IN ELASTICITY | — |
|  | SUN BLEACHING | — |
|  | ODOR PERMEATION | 100 |
|  | WEAR DUE TO USE | — |
|  | DIRTYING OR DAMAGE | — |
|  | ... | ... |
| INSTRUMENT PANEL | SUN BLEACHING | — |
|  | ODOR PERMEATION | 100 |
|  | DIRTYING OR DAMAGE | — |
|  | ... | ... |
| ... | ... | ... |

INFORMATION PROCESSING DEVICE, INFORMATION PROCESSING METHOD, STORAGE MEDIUM, AND INFORMATION PROCESSING SYSTEM

CROSS-REFERENCE TO RELATED APPLICATION

This application is based on and claims priority under 35 USC 119 from Japanese Patent Application No. 2020-217794 filed on Dec. 25, 2020, the disclosure of which is incorporated by reference herein.

BACKGROUND

Technical Field

The present disclosure relates to an information processing device, an information processing method, a storage medium, a program and an information processing system.

Related Art

Japanese Patent Application Laid-Open (JP-A) No. 2015-090703 discloses a used vehicle estimated value providing system in which vehicle terminals, systems of insurance companies, and terminals at vehicle maintenance/repair businesses are connected through a network. In this used vehicle estimated value providing system, the used vehicle value of a vehicle is calculated by taking into consideration the states of the engine oil and parts such as the brake pads and the like. Further, in the system, the states of the respective parts are determined by referring to operation information of the vehicle and to durability prediction curves that are stored in a database and are determined in advance by customer average comparison or at the time of designing the parts.

By the way, depending on environment in which the vehicle is stored and the characteristics of vehicle occupants who use the vehicle, the extents of deterioration of parts that are provided within the cabin of the vehicle such as the instrument panel, the seats and the like may differ greatly even at vehicles that have been used over the same periods of time.

Accordingly, because there are cases in which the deterioration of parts within a vehicle cabin differs from actual deterioration even when taking into consideration the operating conditions and the average durabilities of the parts as in the technique of JP-A No. 2015-090703, it is desirable to effectively reference information that is involved in the deterioration of the respective parts, in order to judge the deterioration appropriately. Accordingly, there is room for improvement with regard to this point in the aforementioned related art technique.

SUMMARY

In view of the above-described circumstances, an object of the present disclosure is to provide an information processing device, an information processing method, a storage medium, a program and an information processing system that, for a part that is provided within a cabin of a vehicle, refer effectively to information that is involved in the deterioration of the part, and can estimate the degree of deterioration of the part.

An information processing device relating to a first aspect of the present disclosure has: a receiving section that communicates with a vehicle and receives deterioration information that is involved in deterioration of a part provided within a cabin of the vehicle; a storage that stores the deterioration information received by the receiving section; and an estimating section that estimates a deterioration degree of the part on the basis of the stored deterioration information.

The information processing device relating to the first aspect of the present disclosure communicates with a vehicle, and receives deterioration information that is involved in the deterioration of a part provided within the vehicle cabin, and stores the received deterioration information. On the basis of the stored deterioration information, the information processing device estimates the deterioration degree of the part. Due thereto, for a part that is provided within the cabin of a vehicle, the deterioration degree of the part can be estimated by effectively referring to information that is involved in the deterioration of the part.

In an information processing device relating to a second aspect of the present disclosure, in the structure of the first aspect, the storage stores the received deterioration information and a deterioration item, which is set in accordance with the part, in correspondence with one another.

In the information processing device relating to the second aspect of the present disclosure, the received deterioration information can be stored in correspondence with a deterioration item that is set in accordance with the part. Therefore, the specific contents of deterioration can be known in accordance with the characteristics of the part.

In an information processing device relating to a third aspect of the present disclosure, in the structure of the second aspect, the deterioration item includes at least one item relating to a decrease in elasticity, sun bleaching, odor permeation, wear due to use, dirtying, and damage.

In the information processing device relating to the third aspect of the present disclosure, specific contents of deterioration relating to a decrease in elasticity, sun bleaching, odor permeation, wear due to use, dirtying, and damage can be known in accordance with the characteristics of the part.

In an information processing device relating to a fourth aspect of the present disclosure, in the structure of any one of the first aspect through the third aspect, the deterioration information is information relating to the vehicle, and includes at least one of in-cabin environment information relating to an environment within the cabin, and usage information relating to the part.

In the information processing device relating to the fourth aspect of the present disclosure, the deterioration degree of the part can be estimated by taking into consideration the environment of the vehicle cabin interior and deterioration information that relates to the vehicle, which is usage information of the part.

In an information processing device relating to a fifth aspect of the present disclosure, in the structure of any one of the first aspect through the fourth aspect, the deterioration information is information relating to an occupant of the vehicle, and includes behavior information relating to a behavior of the vehicle occupant.

In the information processing device relating to the fifth aspect of the present disclosure, the deterioration degree of a part can be estimated by taking into consideration deterioration information that includes behavior information relating to behavior of a vehicle occupant.

In an information processing device relating to a sixth aspect of the present disclosure, in the structure of any one of the first aspect through the fifth aspect, the receiving section is structured so as to be able to receive correction information that includes at least one of body information relating to a body of a vehicle occupant, emotion information relating to emotions of a vehicle occupant, clothing information relating to clothing of a vehicle occupant, and deterioration suppressing information that suppresses deterioration of the part, and, in a case in which the correction information is received, the estimating section estimates the deterioration degree of the part on the basis of the deterioration information and the correction information.

In the information processing device relating to the sixth aspect of the present disclosure, in a case in which correction information is received from the vehicle, the deterioration degree of the part is estimated on the basis of the deterioration information and the correction information. Here, the correction information includes at least one of body information relating to a body of a vehicle occupant, emotion information relating to emotions of a vehicle occupant, clothing information relating to clothing of a vehicle occupant, and deterioration suppressing information that is the behavior of a vehicle occupant and that is involved in suppressing deterioration of the part. These are supplementary information to the above-described deterioration information, and suppress or promote deterioration of a part that accompanies the deterioration information of the part. Accordingly, the deterioration degree of the part can be estimated by taking into consideration the detailed usage mode of the part, from the correction information.

In an information processing device relating to a seventh aspect of the present disclosure, in the structure of any one of the first aspect through the sixth aspect, the estimating section corrects the deterioration degree of the part in accordance with a form of utilization of the vehicle.

In the information processing device relating to the seventh aspect of the present disclosure, the deterioration degree of a part within the vehicle cabin can be corrected by taking the form of utilization of the vehicle into consideration. For example, in a case in which the deterioration degrees may be estimated uniformly such as with parts that are managed in accordance with work regulations such as in vehicles for business or the like, correction that sets the deterioration degrees to be uniform or the like can be carried out for the same parts of vehicles that are used by a same business.

In an information processing device relating to an eighth aspect of the present disclosure, in the structure of the seventh aspect, at least a form in which the vehicle is utilized as a vehicle for household use, and a form in which the vehicle is utilized as a vehicle for business use, are included among types of the forms of utilization.

In the information processing device relating to the eighth aspect of the present disclosure, at the time of estimating the deterioration degree of a part within the vehicle cabin, the deterioration degree of the part can be estimated by taking into consideration whether the vehicle is utilized as a vehicle for household use or is utilized as a vehicle for business use. Accordingly, the deterioration degree of a part can be estimated in accordance with characteristics of various forms of utilization of vehicles, such as, for example, private cars, taxis, carsharing vehicles, and the like.

In an information processing device relating to a ninth aspect of the present disclosure, the structure of any one of the first aspect through the eighth aspect has a deterioration information specifying section, and, in a case in which the receiving section does not receive deterioration information from the vehicle, the receiving section receives position information of the vehicle, and the deterioration information specifying section, on the basis of the received position information, acquires periphery information relating to the environment of the periphery of the vehicle, and, on the basis of the periphery information, specifies deterioration information of the part.

In the information processing device relating to the ninth aspect, in a case in which deterioration information is not received from the vehicle, periphery information relating to the environment of the periphery of the vehicle is acquired on the basis of the position information of the vehicle. Deterioration information that is involved in the deterioration of the part within the vehicle cabin can be specified on the basis of the acquired periphery information. Accordingly, even during stoppage when the engine is stopped, or in a state in which communication between the vehicle and the information processing device is impossible, estimating of the deterioration degree relating to the part can be continued.

In an information processing device relating to a tenth aspect of the present disclosure, the structure of any one of the first aspect through the eighth aspect has an information updating section, and the receiving section is structured so as to be able to receive inspection information of the vehicle, and the information updating section compares a deterioration degree of the part in the received inspection information and an estimated deterioration degree of the part, and, in a case in which the both differ, updates the deterioration degree of the part to the deterioration degree in the inspection information.

In the information processing device relating to the tenth aspect of the present disclosure, in a case in which the estimated deterioration degree of the part differs from the deterioration degree of the part that was judged at the time when the vehicle as inspected in actuality, the deterioration degree of that part is updated to the deterioration degree in the inspection information. Accordingly, the deterioration degree of a part can be estimated by taking into consideration newly-received deterioration information and correction information, on the basis of the estimated value of the deterioration degree of the part that corresponds to the most recent inspection information.

An information processing method relating to an eleventh aspect of the present disclosure includes: communicating with a vehicle and receiving deterioration information that is involved in deterioration of a part provided within a cabin of the vehicle; storing the deterioration information that was received by the receiving section; and estimating a deterioration degree of the part on the basis of the deterioration information accumulated in the storage.

In accordance with the information processing method relating to the eleventh aspect of the present disclosure, as described above, for a part that is provided within the cabin of a vehicle, the deterioration degree of the part can be estimated by effectively referring to information that is involved in the deterioration of the part.

A program relating to a twelfth aspect of the present disclosure causes a computer to execute processings including: communicating with a vehicle and receiving deterioration information that is involved in deterioration of a part provided within a cabin of the vehicle; storing the deterioration information that was received by the receiving section; and estimating a deterioration degree of the part on the basis of the deterioration information accumulated in the storage.

In accordance with the program relating to the twelfth aspect of the present disclosure, as described above, for a part that is provided within the cabin of a vehicle, the deterioration degree of the part can be estimated by effectively referring to information that is involved in the deterioration of the part.

An information processing system relating to a thirteenth aspect of the present disclosure is an information processing system structured such that vehicles, an information processing device, a vehicle maintenance/repair business terminal, and a used vehicle sales business terminal can communicate via a network, wherein the information processing device has: a receiving section that communicates with a vehicle and receives deterioration information that is involved in deterioration of a part provided within a cabin of the vehicle; a storage that stores the deterioration information received by the receiving section; an estimating section that estimates a deterioration degree of the part on the basis of the deterioration information stored in the storage; and a transmitting section that transmits the estimated deterioration degree of the part to the vehicle maintenance/repair business terminal or the used vehicle sales business terminal.

In accordance with the information processing system relating to the thirteenth aspect of the present disclosure, for a part that is provided within the cabin of a vehicle, the deterioration degree of the part can be estimated by effectively referring to information that is involved in the deterioration of the part. Moreover, the deterioration degree of the part within the vehicle cabin can be provided through a terminal to a vehicle maintenance/repair business terminal or a used vehicle sales business terminal. As a result, at the time of a vehicle inspection or of assessing a used vehicle, the inspecting or assessment can be carried out by referring to deterioration degrees of parts that are stored in the information processing device.

As described above, in accordance with the present disclosure, for a part that is provided within the cabin of a vehicle, the deterioration degree of the part can be estimated by effectively referring to information that is involved in the deterioration of the part.

BRIEF DESCRIPTION OF THE DRAWINGS

Exemplary embodiments of the present invention will be described in detail based on the following figures, wherein:

FIG. 4 is an example of a deterioration information table;

FIG. 5 is an example of a correction information table;

FIG. 8 is an example of a deterioration information database;

FIG. 9 is an example of a deterioration level table;

FIG. 10 is an example of a per utilization form correction table;

DETAILED DESCRIPTION

<Overview>

An information processing system 1 relating to the present embodiment is described hereinafter with reference to FIG. 1 through FIG. 13.

Figure 1:
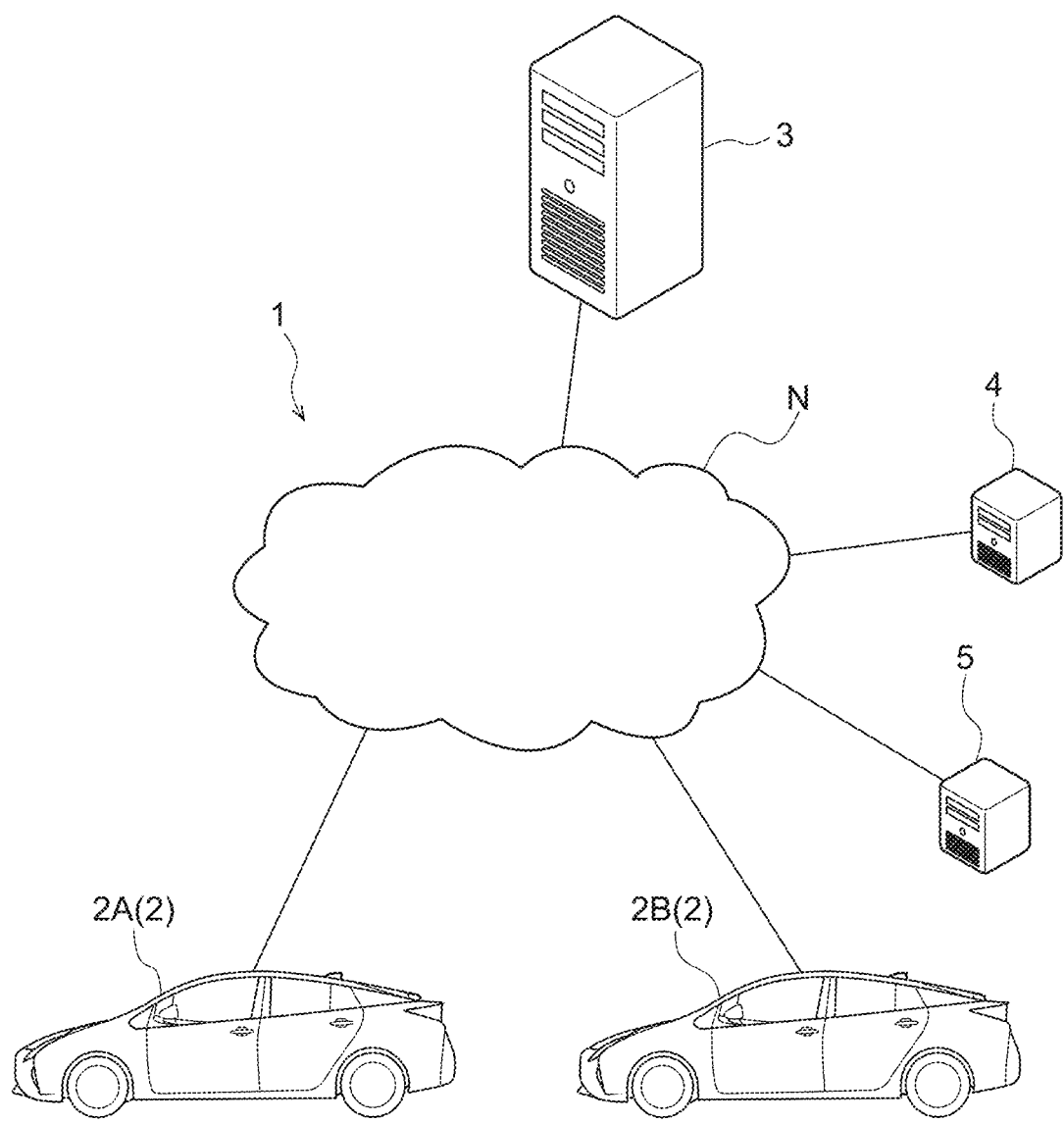
FIG. 1 is a drawing showing an overview of an information processing system relating to a present embodiment.

As shown in FIG. 1, in this information processing system 1, estimating of degrees of deterioration is carried out for parts that are provided within the cabins of vehicles 2. Concretely, the information processing system 1 includes the plural vehicles 2 (vehicle 2A, vehicle 2B) and an information processing device 3 that can communicate via a network. Various types of information relating to the vehicle and the vehicle occupants are acquired at the vehicle 2. The information processing device 3 is structured so as to be able to receive, from among the information acquired at the vehicles 2, deterioration information that is involved in the deterioration of parts provided within the cabins of the vehicles.

In addition to functional parts such as seats, switches of operating systems, the steering wheel and the like, interior parts such as the instrument panel and door trims are included among the parts that are provided within the cabin of the vehicle 2. With regard to the deterioration of these parts, it is difficult to judge the actual degrees of deterioration only from information such as the model year of the vehicle and the traveled distance thereof and the like, and damage that is due to ultraviolet light and damage that is due to behaviors of vehicle occupants must be taken into consideration. Deterioration information includes information relating to ultraviolet light damage within the vehicle cabin and to the specific mode of usage of the vehicle 2 which is behaviors of vehicle occupants.

The information processing device 3 stores the received deterioration information, and estimates the deterioration degrees of the respective parts within the vehicle cabin. Further, the information processing device 3 is structured so as to be able to transmit the estimated results for the respective parts to a vehicle maintenance/repair business terminal 4 and a used vehicle sales business terminal 5 that can communicate with one another via a network N.

<Hardware Structures of Information Processing Device of Vehicle>

Figure 2:
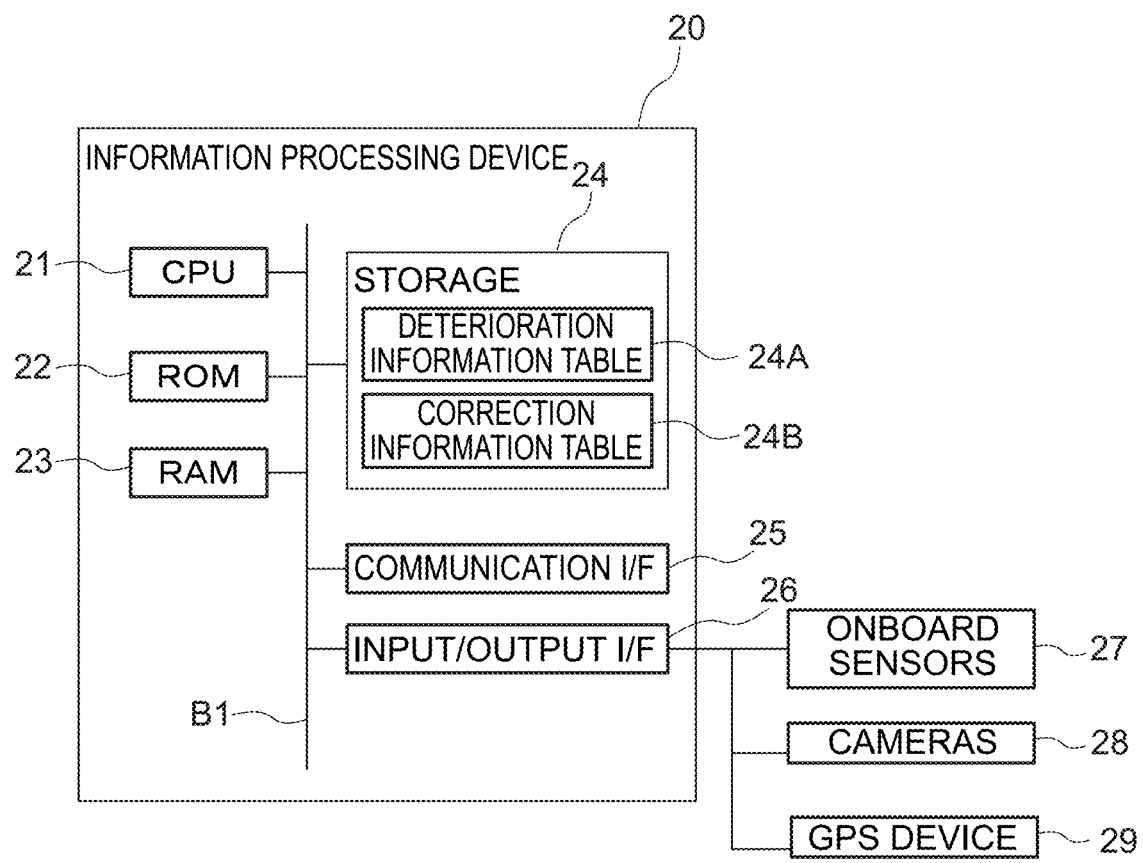
FIG. 2 is a block drawing showing an example of hardware structures of an information processing device that is installed in a vehicle.

FIG. 2 is a block drawing showing the hardware structures of an information processing device 20 of the vehicle 2. The information processing device 20 is structured to include a CPU (Central Processing Unit) 21, a ROM (Read Only Memory) 22, a RAM (Random Access Memory) 23, a storage 24, a communication interface (I/F) 25 and an input/output interface 26. The CPU 21 is an example of the processor, and the RAM 23 is an example of the memory. The CPU 21, the ROM 22, the RAM 23, the storage 24, the communication interface 25 and the input/output interface 26 are connected so as to be able to communicate with one another via a bus B1.

Figure 3:
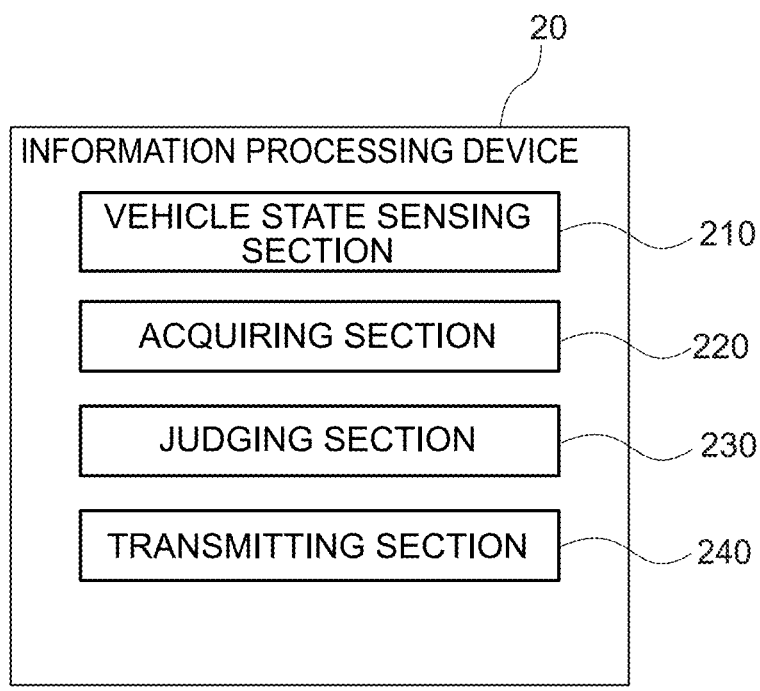
FIG. 3 is a block drawing showing an example of functional structures of the information processing device that is installed in the vehicle.

The CPU 21 is a central computing processing unit, and executes various programs and controls the respective sections. Namely, the CPU 21 reads-out a program from the ROM 22, and executes the program by using the RAM 23 as a workspace. In the present embodiment, an execution program is stored in the ROM 22 or the storage 24. By executing the execution program, the CPU 21 functions as a vehicle state sensing section 210, an acquiring section 220, a judging section 230 and a transmitting section 240 that are shown in FIG. 3.

The ROM 22 stores various programs and various data. The RAM 23 temporarily stores programs and data as a workspace. The storage 24 that serves as the storage is structured by an HDD (Hard Disk Drive) or an SSD (Solid State Drive), and stores various programs, including the operating system, and various data. In the present embodiment, a deterioration information table 24A and a correction information table 24B are stored in the storage 24.

The communication interface 25 is an interface for communication with the information processing device 3, the vehicle maintenance/repair business terminal 4, the used vehicle sales business terminal 5 and the like, and uses, for example, standards such Ethernet®, FDDI, Wi-Fi® or the like. The input/output interface 26 is an interface for connecting external devices to the information processing device 20. In the present embodiment, onboard sensors 27, cameras 28 that capture images of the vehicle cabin interior, a GPS device 29 and the like are connected to the input/output interface 26. The onboard sensors 27 are structured to include at least one of a temperature sensor, a humidity sensor, a sunlight sensor, an ultraviolet light sensor, pressure sensitive sensors of the seats, buckle sensors, seatbelt sensors, and door opening/closing sensors.

As shown in FIG. 4, information that are parts provided within the cabin of the vehicle 2, deterioration information, information identification codes, and deterioration scores are set in correspondence with one another in the deterioration information table 24A. The deterioration information is information that is involved in the deterioration of the corresponding part, and is structured by information relating to the vehicle and vehicle occupants. Deterioration information relating to the vehicle includes environment information that expresses the environment within the cabin of the vehicle, and usage information relating to the use of the part that is within the cabin. Environment information includes, for example, temperature information, humidity information, information regarding the amount of sunlight and information regarding the amount of ultraviolet light, of the cabin interior. Usage information includes, for example, information relating to the number of times of use and continuous usage times of the respective parts, such as seating information of the seats, operation information of the respective operation switches, running information of the air conditioner and the interior lights, and the like.

Deterioration information relating to vehicle occupants includes behavior information of the vehicle occupants. Behavior information is structured by information of behaviors that cause odors to permeate into predetermined parts or that are involved in damaging or dirtying parts, such as smoking, eating/drinking, riding together with pets, and the like of vehicle occupants within the vehicle cabin.

The information identification codes (P1, P2, ..., Pm, ..., Pn, ...) are codes for identification that set the parts and the deterioration information in correspondence with one another. The deterioration score is a score showing the degree to which that deterioration information is involved in the deterioration of the part, and is set in advance.

For example, temperature information, humidity information, amount of sunlight and amount of ultraviolet light within the cabin are included as the deterioration information that are involved in the alteration or sun bleaching of the seat surfaces, in the deterioration information of seat 1 that serves as a part within the vehicle cabin. Seating information expressing the number of times vehicle occupants have sat down on and the lengths of times that vehicle occupants have sat in a seat is included as deterioration information that is involved in a decrease in the elasticity of the seat cushion. Smoking information and eating/drinking information are included as deterioration information that are involved in the permeating of odors into the seat 1. For example, for each of these deterioration information, a threshold value is set in accordance with the item, and when deterioration information that is greater than or equal to the threshold value is acquired at the vehicle 2, the information processing device 3 is notified of the deterioration information and the deterioration score. Note that the numbers of and the contents of the deterioration information that are set in accordance with the respective parts can be changed appropriately as needed.

As shown in FIG. 5, information identification codes, correction information and correction scores are set in correspondence with one another in the correction information table 24B. The correction information is structured by information that relates to the deterioration information and that is involved in the suppression of or the promotion of the deterioration of the part. For example, information such as window opening information and the introducing of outside air by an air conditioner and the like, which suppress the permeating of odors into parts, are included in correction information that is involved in suppression of deterioration. On the other hand, body information, emotion information, and clothing information of vehicle occupants are included in correction information that is involved in the promotion of deterioration. Body information includes, for example, information such as the physique of the vehicle occupant, whether the vehicle occupant is an adult or a child, or the like.

For example, body information that relates to the physique of a vehicle occupant is set, as correction information that promotes deterioration, in correspondence with the deterioration information that is seating information that is involved in a decrease in elasticity of the seat cushion of the seat 1, i.e., information identification code P5 in FIG. 4 and FIG. 5. For example, when the vehicle 2 senses, by a pressure-sensitive sensor that is provided at the seat 1, that the weight of the seated vehicle occupant is greater than or equal to a threshold value, the vehicle 2 sets correction information, which expresses that the vehicle occupant is of a large build, and a correction score in correspondence with the information identification code, and provides this information to the information processing device 3. In a case in which there is correction information that promotes deterioration of the part such as in a case in which the vehicle occupant is of a large build, the correction score is set to a positive value.

On the other hand, window opening information and information relating to the introducing of outside air by the air conditioner are set, as correction information that suppress deterioration, in correspondence with deterioration information relating to smoking information that is involved in the permeating of odors into the seat 1, i.e., information identification code P6 in FIG. 4 and FIG. 5. In this way, the correction score is set to a negative value for correction information that suppresses deterioration.

Similarly, window opening information and information relating to the introducing of outside air by the air conditioner are set, as information that suppress deterioration, in correspondence with deterioration information that relates to eating/drinking information that is involved in odors permeating into, and to damage or dirtying of, the seat 1 (information identification code P7). On the other hand, correction information, which expresses that a vehicle occupant is a child, is set in correspondence as correction information that promotes deterioration. At the vehicle 2, for example, it is judged that a vehicle occupant is a child in a case in which the pressure-sensitive sensor of the seat 1 senses that the body weight of the vehicle occupant is less than or equal to a predetermined threshold value, or by analysis of images of the cameras that capture images of the cabin interior of the vehicle. In consideration of the risk of spilling food onto the seat 1, the information processing device 3 is notified of the correction information expressing that the vehicle occupant is a child and the correction score, in correspondence with the information identification code.

<Functional Structures of Information Processing Device of Vehicle>

FIG. 3 is a block drawing showing an example of the functional structures of the information processing device 20. The information processing device 20 has the vehicle state sensing section 210, the acquiring section 220, the judging section 230 and the transmitting section 240. These respective functional structures are realized by the CPU 21 reading-out the execution program that is stored in the ROM 22, and executing the program.

The vehicle state sensing section 210 has the function of sensing operation and stoppage of the engine of the vehicle 2.

The acquiring section 220 acquires information relating to the vehicle 2 and the vehicle occupants from the onboard sensors 27, the cameras 28 and the GPS device 29 of the vehicle 2.

The judging section 230 judges whether or not the information acquired by the acquiring section 220 is deterioration information that is involved in the deterioration of parts provided within the cabin of the vehicle. Concretely, the vehicle 2 analyzes the information acquired by the onboard sensors 27 and the cameras 28 that capture images of the vehicle interior, and specifies the behaviors that are being carried out by the vehicle and the vehicle occupants. Then, with reference to the deterioration information table 24A, the judging section 230 judges whether or not the behaviors of the vehicle and the vehicle occupants are deterioration information.

Further, the judging section 230 judges whether or not the information acquired by the acquiring section 220 is correction information. Concretely, the judging section 230 analyzes the information acquired from the onboard sensors 27 and the cameras 28 that capture images of the vehicle interior, and specifies behavior information, body information, and clothing information of the vehicle occupants. Then, with reference to the correction information table 24B, the judging section 230 judges whether or not the specified information is deterioration information.

The transmitting section 240 transmits the information, which has been judged to be deterioration information by the judging section 230, and the correction information, in correspondence with the deterioration score and the information identification code, to the information processing device 3.

Further, in a case in which it is difficult for the acquiring section 220 to acquire information from the onboard sensors 27 and the cameras 28, the transmitting section 240 transmits position information of the vehicle 2 to the information processing device 3 on the basis of the position information of the GPS device 29. Note that cases in which it is difficult for the acquiring section 220 to acquire information from the onboard sensors 27 and the cameras 28 are, for example, cases in which, due to the operation of a vehicle occupant, the ignition switch of the vehicle 2 is turned off and the engine of the vehicle 2 is stopped, and cases in which problems arise in the transmission environment of the vehicle 2.

<Hardware Structures of Information Processing Device>

Figure 6:
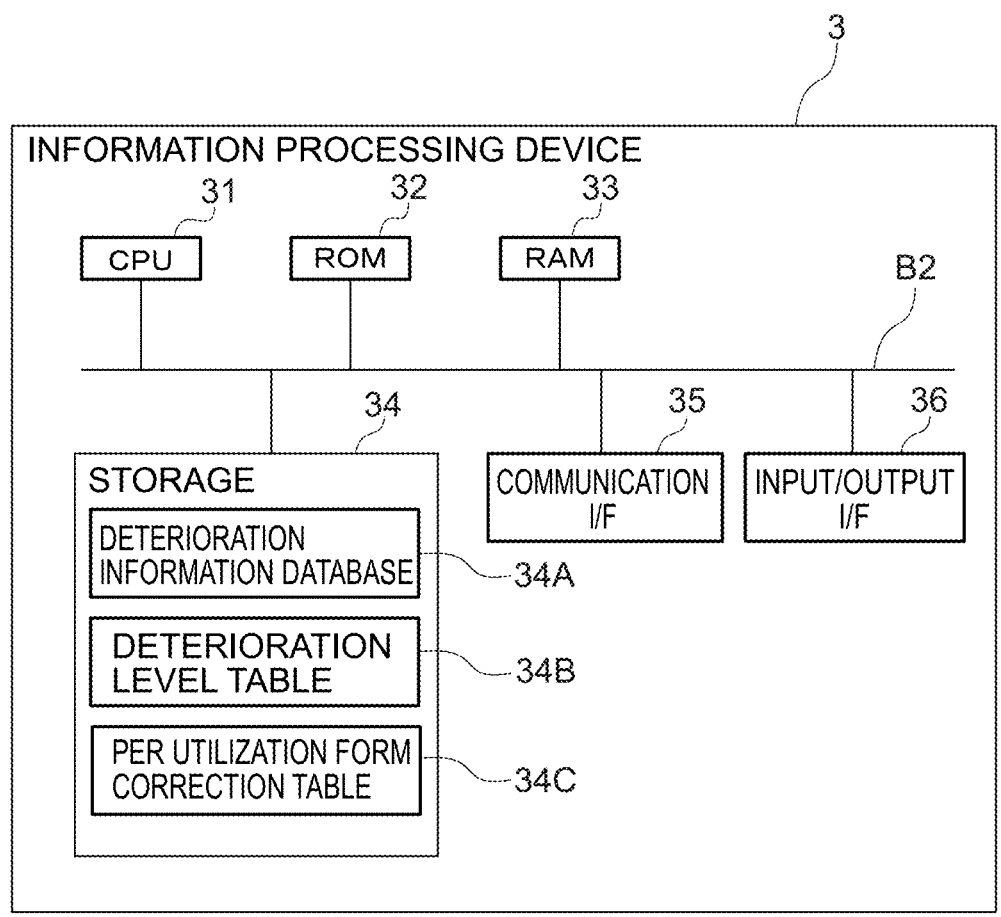
FIG. 6 is a block drawing showing an example of hardware structures of an information processing device relating to the present embodiment.

An example of the hardware structures of the information processing device 3 are described next with reference to FIG. 6. The information processing device 3 is structured to include a CPU (Central Processing Unit) 31, a ROM (Read Only Memory) 32, a RAM (Random Access Memory) 33, a storage 34, a communication interface (I/F) 35, and an input/output interface 36. The CPU 31, the ROM 32, the RAM 33, the storage 34, the communication interface 35 and the input/output interface 36 are connected so as to be able to communicate with one another via a bus B2.

Figure 7:
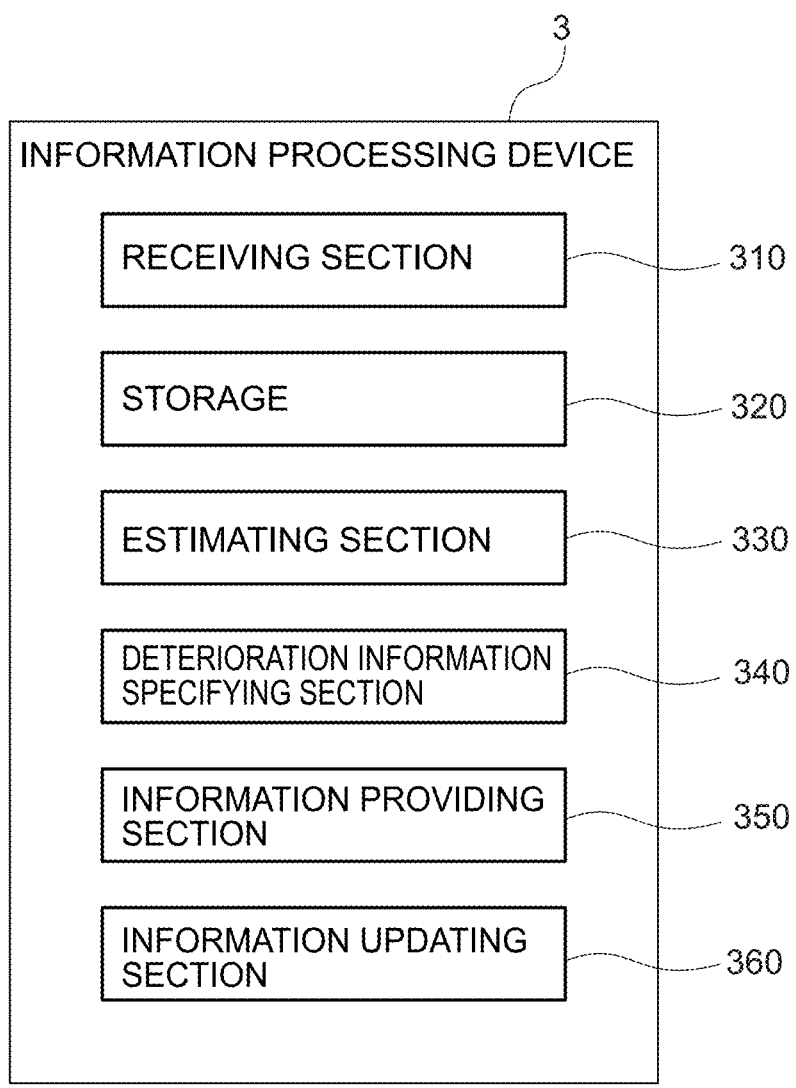
FIG. 7 is a block drawing showing an example of functional structures of the information processing device relating to the present embodiment.

The CPU 31 is a central computing processing unit, and executes various programs and controls respective sections. Namely, the CPU 31 reads-out a program from the ROM 32, and executes the program by using the RAM 33 as a workspace. In the present embodiment, an execution program is stored in the ROM 32 or the storage 34. By executing the execution program, the CPU 31 functions as a receiving section 310, a storage 320, an estimating section 330, a deterioration information specifying section 340, an information providing section 350 and an information updating section 360 that are shown in FIG. 7.

The ROM 32 stores various programs and various data. The RAM 33 temporarily stores programs and data as a workspace. The storage 34 that serves as the storage is structured by an HDD (Hard Disk Drive) or an SSD (Solid State Drive), and stores various programs, including the operating system, and various data. In the present embodiment, a deterioration information database 34A, a deterioration level table 34B and a per utilization form correction table 34C are stored in the storage 34.

The communication interface 35 is an interface for communication with the information processing devices 20 of the vehicles 2, the vehicle maintenance/repair business terminal 4, the used vehicle sales business terminal 5 and the like, and uses, for example, standards such Ethernet®, FDDI, Wi-Fi® or the like. The input/output interface 36 is an interface for connecting external devices to the information processing device 3.

As shown in FIG. 8, received deterioration information is stored in the deterioration information database 34A. The deterioration information database 34A stores, in correspondence with one another, parts that are provided within the vehicle cabin, deterioration items that are set in accordance with the parts, information identification codes, total scores, and deterioration levels.

The deterioration items are set in consideration of the characteristics of the respective parts, and at least one item among decrease in elasticity, sun bleaching, odor permeation, wear due to use, and dirtying and damage is set therefor. For example, for the seat 1, deterioration that is due to external force caused by the body weight of vehicle occupants, sunlight, odors such as cigarette smoke or the like, and rubbing of clothing can be imagined. Accordingly, as deterioration items that take into consideration characteristics in using the seat 1, decrease in elasticity, sun bleaching, odor permeation, wear due to use, and dirtying and damage are set as the deterioration items. On the other hand, for the instrument panel, deterioration items that are due to external force inputted by vehicle occupants, sunlight, odor caused by cigarette smoke or the like, can be imagined, but a decrease in elasticity cannot. Accordingly, sunlight, odor permeation, wear due to use, and dirtying and damage are set as the deterioration items for the instrument panel.

The total score is the total value of the deterioration scores and the correction scores that correspond to the received deterioration information, or is the value of the total score that has been corrected by referring to the per utilization form correction table 34C. The deterioration level expresses the degree of deterioration of the part per deterioration item. The deterioration level is determined by referencing the value of the total score and the deterioration level table 34B.

As shown in FIG. 9, as an example, total scores and deterioration levels are set in correspondence with one another in the deterioration level table 34B.

As shown in FIG. 10, as an example, the per utilization form correction table 34C is prepared for each form of utilization of the vehicle, and is stored in the storage 34. Parts that are provided within the cabin of the vehicle 2, deterioration items that are set in correspondence with the parts, and total scores are set in correspondence with one another in the per utilization form correction table 34C. In the present embodiment, for example, there are two forms of utilization of a vehicle that are a form in which the vehicle is utilized as a vehicle for household use, and a form in which the vehicle is utilized as a vehicle for business use. Vehicles that are utilized as public transportation means, vehicles utilized as taxis, vehicles utilized for carsharing, and the like are included among vehicles for business use.

A predetermined value is set for the total score at each item at which score correction corresponding to the utilization form of the vehicle is required. On the other hand, no total score is set for items that do not require score correction corresponding to the form of utilization of the vehicle. For example, 100 is set as the value of the total score at the deterioration item of odor permeation of the seat 1, but total score values are not set for other deterioration items of the seat 1. Accordingly, it can be understood that, for the seat 1, correction of the degree of deterioration, which corresponds to a predetermined utilization form of the vehicle 2, is carried out for the odor permeation item.

Note that classifying the form of utilization of the vehicle into the above-described two forms is merely an example, and the classifications of the form of utilization can be changed appropriately. For example, the above described household use vehicles and business use vehicles may be subdivided, and, in the case in which the vehicle is a vehicle for household use, a per utilization form correction table may be prepared for each user of the vehicle 2. Further, in a case in which the vehicle is a vehicle for business use, a per utilization form correction table may be prepared for each of respective types of businesses such as a public transportation vehicle, a taxi, a carsharing vehicle, a delivery vehicle, or the like. Or, even in a same industry, a per utilization form correction table may be prepared for each of respective operating companies.

<Functional Structures of Information Processing Device>
An example of the functional structures of the information processing device 3 are described next with reference to FIG. 7. The information processing device 3 has the receiving section 310, the storage 320, the estimating section 330, the deterioration information specifying section 340, the information providing section 350 and the information updating section 360. These respective functional structures are realized by the CPU 31 reading-out the execution program that is stored in the ROM 32, and executing the program.

The receiving section 310 receives deterioration information that is involved in the deterioration of parts provided in the cabin of the vehicle 2, from the vehicle 2 via the communication interface 35. Further, in a case in which deterioration information is not received from the vehicle 2, the receiving section 310 receives position information of the vehicle 2. Note that cases in which deterioration information is not received from the vehicle 2 are cases in which the engine of the vehicle 2 is stopped at the time of stopping, and cases in which communication between the vehicle 2 and the information processing device 3 is impossible.

Further, in a case in which inspection work on the vehicle is being carried out by a vehicle maintenance/repair business, the receiving section 310 receives inspection information that includes the results of the inspection from the vehicle maintenance/repair business terminal 4.

The storage 320 adds the deterioration score of the deterioration information and the correction score of the correction information which were received at the receiving section 310, and stores the sum in the deterioration information database 34A. At this time, the total score that is the sum of the deterioration score and the correction score is stored in correspondence with the deterioration item that is set in accordance with the part. Further, the storage 320 adds the deterioration score of the deterioration information specified at the deterioration information specifying section to the corresponding total score, and stores the sum. In other words, the deterioration information and the correction information are converted to a corresponding score and stored (accumulated).

The estimating section 330 estimates the deterioration degree of the part on the basis of the deterioration information and the correction information that are stored in the deterioration information database 34A. Concretely, the estimating section 330 refers to the value of the total score of the deterioration information database 34A and to the deterioration level table 34B, and estimates the deterioration level for each of the deterioration items of the part. Further, the estimating section 330 corrects the total score of the deterioration information database 34A while referring to the per utilization form correction table 34C that is set in correspondence with the vehicle 2.

On the basis of position information of the vehicle 2, the deterioration information specifying section 340 acquires periphery information relating to the environment at the periphery of the vehicle. The periphery information is structured to include at least one of weather information, ultraviolet light information, map data, and satellite image data. On the basis of the acquired periphery information, the deterioration information specifying section 340 estimates the environment within the cabin of the vehicle, and specifies the deterioration information of the parts provided within the cabin. For example, the position of the vehicle 2 is specified from the position information, and, in a case in which it is judged, on the basis of map data or satellite image data, that the vehicle 2 is stopped in an outdoor parking area without a roof, when a sunlight amount or ultraviolet light amount of a predetermined threshold value or more is calculated on the basis of the weather information or the ultraviolet light information of the vicinity, the sunlight information and the ultraviolet light information are specified as deterioration information of the vehicle 2.

The information providing section 350 transmits and provides the estimated deterioration levels of the respective parts to respective terminals, in accordance with requests from the vehicle 2, the vehicle maintenance/repair business terminal 4, and the used vehicle sales business terminal 5.

The information updating section 360 refers to the inspection information of the vehicle, and updates the deterioration information. Concretely, the information updating section 360 refers to the inspection information that is included in the results of the inspection of the vehicle and to the deterioration information database 34A, and, for the respective inspection items corresponding to the deterioration items of the respective parts, judges whether the deterioration degree (the deterioration level) that was judged by a mechanic and the estimated deterioration degree in the deterioration information database are different. Then, in a case in which there is an item whose deterioration degrees are different, the information updating section 360 rewrites the deterioration degree of the deterioration information database 34A to the deterioration degree of the inspection information that was judged by the mechanic.

<Operation>

The flows of processings at the information processing system 1 of the present embodiment are described next with reference to the flowcharts of FIG. 11, FIG. 12 and FIG. 13.

First, information acquiring processing, which is carried out at the time when the engine of the vehicle 2 is turned on, is described with reference to FIG. 11.

Figure 11:
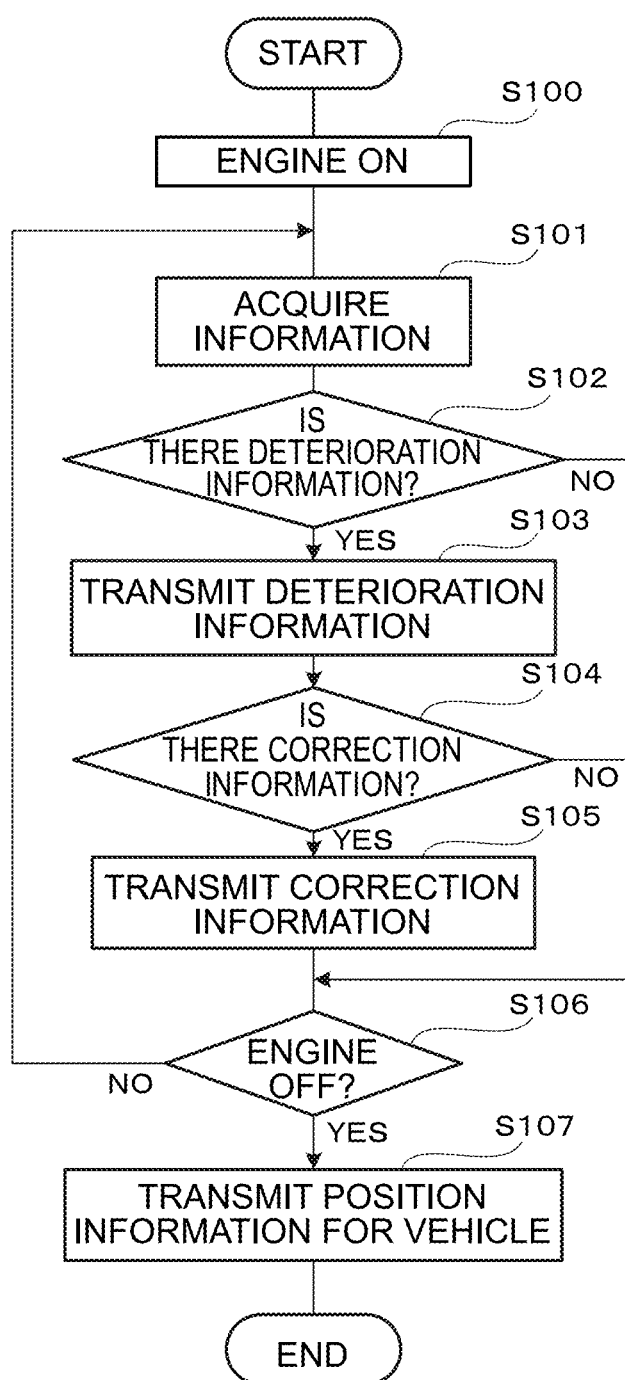
FIG. 11 is an example of a flowchart relating to information acquiring processing.

As shown in FIG. 11, in step S100, when the CPU 21 of the information processing device 20 of the vehicle 2 senses that the engine of the vehicle 2 is in an on state, the CPU 21 moves on to next step S101.

In step S101, on the basis of the function of the acquiring section 220, the CPU 21 acquires various types of information relating to the vehicle 2 and the vehicle occupants.

In step S102, on the basis of the function of the judging section 230, the CPU 21 judges whether or not there is deterioration information among the acquired information. If the CPU 21 judges that there is deterioration information, in step S103, the CPU 21 transmits the information that is judged to be deterioration information to the information processing device 3. On the other hand, in a case in which the CPU 21 judges that there is no deterioration information in the acquired information, the CPU 21 moves on to step S106.

In step S104, on the basis of the function of the judging section 230, the CPU 21 judges whether or not there is correction information among the acquired information. If the CPU 21 judges that there is correction information, in step S105, the CPU 21 transmits the information judged to be correction information to the information processing device 3. On the other hand, in a case in which the CPU 21 judges that there is no correction information in the acquired information, the CPU 21 moves on to step S106.

In step S106, the CPU 21 judges whether or not the engine of the vehicle 2 is in an off state. If the CPU 21 judges that the engine is in an off state, in step S107, on the basis of the position information of the GPS device 29, the CPU 21 transmits the position information of the vehicle 2 to the information processing device 3, and ends processing. On the other hand, if the CPU 21 judges that the engine of the vehicle 2 is not in an off state, the CPU 21 returns to step S101, and repeats processings.

Deterioration degree estimating processing that is carried out at the information processing device 3 is described next with reference to FIG. 12.

In step S200, the CPU 31 of the information processing device 3 judges whether or not the engine of the vehicle 2 is in an on state. The on state and the off state of the engine of the vehicle may be judged by, for example, a predetermined control signal being transmitted from the vehicle 2 to the information processing device 3 at the time when the engine is started and at the time when the engine is stopped. If, in step S200, the CPU 31 judges that the engine is in an on state, the CPU 31 moves on to step S201. On the other hand, if the CPU 31 judges that the engine is not in an on state, the CPU 31 moves on to step S203.

In step S201, on the basis of the function of the receiving section 310, the CPU 31 receives deterioration information and correction information from the vehicle 2.

In step S202, on the basis of the function of the storage 320, the CPU 31 stores the received deterioration information and correction information. When the CPU 31 stores the deterioration information and the correction information, the CPU 31 moves on to step S207.

On the other hand, in step S203, on the basis of the function of the receiving section 310, the CPU 31 receives position information of the vehicle 2.

In step S204, on the basis of the function of the deterioration information specifying section 340, the CPU 31 acquires periphery information of the vehicle.

In step S205, on the basis of the acquired periphery information, the CPU 31 specifies deterioration information of parts that are provided in the cabin of the vehicle.

In step S206, on the basis of the function of the storage 320, the CPU 31 stores the specified deterioration information, and moves on to step S207.

In step S207, on the basis of the function of the estimating section 330, the CPU 31 executes correction processing that corresponds to the form of utilization of the vehicle. Concretely, the CPU 31 refers to the per utilization form correction table 34C that corresponds to the form of utilization of the vehicle, and carries out correction such that the total score, which is set in the per utilization form correction table 34C, becomes the total score of the corresponding deterioration information of the deterioration information database 34A.

In step S208, on the basis of the function of the estimating section 330, the CPU 31 specifies the total score that corresponds to the deterioration item for each part.

In step S209, on the basis of the function of the estimating section 330, the CPU 31 estimates the deterioration level of the part, per deterioration item. Concretely, the CPU 31 refers to the total score of the deterioration information database 34A and to the deterioration level table 34B, and estimates the deterioration level. When estimating of the deterioration level ends, the CPU 31 ends the processing.

Next, information updating processing, which is carried out at the information processing device 3 at the time when an inspection is carried out on the vehicle 2 by a vehicle maintenance/repair business or the like, is described with reference to FIG. 13.

Figure 13:
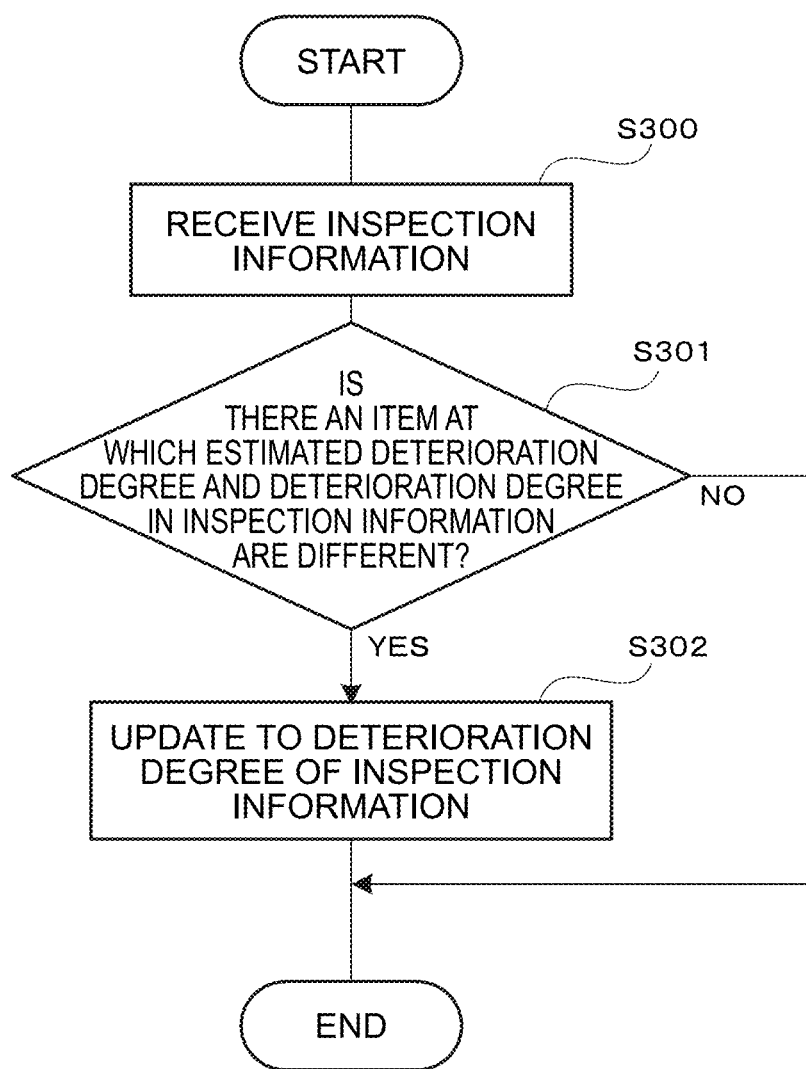
FIG. 13 is an example of a flowchart relating to information updating processing.

In step S300 of FIG. 13, on the basis of the function of the receiving section 310, the CPU 31 receives inspection information of the vehicle 2 from the vehicle maintenance/repair business terminal 4.

In step S301, on the basis of the function of the information updating section 360, the CPU 31 judges whether there is a deterioration item at which the deterioration level of the part, which was estimated on the basis of the function of the estimating section 330, and the deterioration level of the same part in the inspection information, are different. Concretely, this is judged by the CPU 31 referring to the inspection results of the inspected items of the inspection information and the deterioration degrees of the respective parts in the deterioration information database 34A. In a case in which it is judged that there is an item whose deterioration degrees are different, the CPU 31 moves on to step S302. On the other hand, in a case in which it is judged that the deterioration degrees match, the CPU 31 ends the processing.

In step S302, on the basis of the function of the information updating section 360, for the corresponding deterioration item of the deterioration information database 34A, the CPU 31 updates the deterioration degree thereof to the deterioration degree that was judged at the time of inspecting the vehicle, and ends processing.

As described above, the information processing device 3 of the present embodiment communicates with the vehicles 2 and receives deterioration information that is involved in the deterioration of parts provided within the vehicle cabin, and stores the received deterioration information. Then, on the basis of the stored deterioration information, the information processing device 3 estimates the deterioration degrees of the parts. Due thereto, for parts that are provided within the cabin of the vehicle 2, the deterioration degree of a part can be estimated by effectively referring to information that is involved in the deterioration of the part.

Further, in the present embodiment, the received deterioration information is stored in the deterioration information database 34A in correspondence with deterioration items that are set in accordance with the part. Therefore, the specific contents of the deterioration can be known in accordance with the characteristics of the part. Concretely, the deterioration items include at least one item relating to a decrease in elasticity, sun bleaching, odor permeation, wear due to use, and dirtying and damage. Accordingly, the deterioration of a part, which relates to these specific items, can be known.

Further, in the present embodiment, the deterioration degree of a part can be estimated on the basis of in-cabin environment information, and deterioration information that relates to the usage information of the part. Accordingly, the environment in which the vehicle 2 is stored, and the frequency of use of the parts, can be known, and the deterioration of the parts can be estimated effectively.

Further, in the present embodiment, the deterioration degree of a part can be estimated on the basis of behavior information of the vehicle occupants. Accordingly, deterioration of parts can be estimated effectively by taking into consideration the history of concrete behaviors of vehicle occupants, such as, for example, smoking, eating/drinking, riding together with pets, and the like within the cabin of the vehicle.

Further, in the present embodiment, in a case in which correction information is received from the vehicle 2, the deterioration degree of a part is estimated on the basis of the deterioration information and the correction information. Here, the correction information includes at least one of body information relating to the body of a vehicle occupant, emotion information relating to emotions of a vehicle occupant, clothing information relating to the clothing of a vehicle occupant, and deterioration suppressing information that is behaviors of a vehicle occupant and is involved in the suppression of deterioration of the part. These are supplementary information to the above-described deterioration information, and suppress or promote deterioration of a part that accompanies the deterioration information of the part. Accordingly, the deterioration degrees of the parts can be estimated by taking into further consideration the detailed usage modes of the respective parts, from the correction information.

Further, in the present embodiment, the deterioration degrees of the parts within the vehicle cabin can be corrected by taking the form of utilization of vehicle 2 into consideration. Concretely, at least a form in which the vehicle is utilized as a vehicle for household use, and a form in which the vehicle is utilized as a vehicle for business use, are included in the types of forms of utilization. As a result, for example, in a case in which deterioration degrees may be estimated uniformly such as with parts that are managed in accordance with work regulations such as in vehicles for business or the like, correction that sets the deterioration degrees to be uniform or the like can be carried out for the same parts of vehicles that are used by a same business.

Further, in the present embodiment, in a case in which deterioration information is not received from the vehicle 2, i.e., in a case in which the engine of the vehicle 2 is in an off state, periphery information relating to the environment at the periphery of the vehicle is acquired on the basis of the position information of the vehicle 2. Then, on the basis of the acquired periphery information, deterioration information that is involved in the deterioration of parts within the cabin can be specified. Accordingly, even in a case in which the vehicle is stopped, or in a state in which communication between the vehicle 2 and the information processing device 3 is impossible, estimating of the deterioration degrees relating to the parts can be continued.

Further, in the present embodiment, inspection information of the vehicle 2 is received, and, in a case in which the deterioration degree of a part, which is estimated on the basis of the function of the estimating section 330, is different than the deterioration degree of the part that was actually judged at the time of inspecting the vehicle 2, the deterioration degree of that part is updated to the deterioration degree of the inspection information. Accordingly, the deterioration degree of a part can be estimated by taking into consideration newly-received deterioration information and correction information, on the basis of the estimated value of the deterioration degree of the part that corresponds to the most recent inspection information.

Further, in the information processing system of the present embodiment, the deterioration degrees of parts within the vehicle cabin can be provided through a terminal to a vehicle maintenance/repair business or a used vehicle sales business. As a result, at the time of a vehicle inspection or at the time of assessing a used vehicle, confirmation of the deterioration degrees of the parts can be carried out by taking the specific mode of use of the vehicle into consideration.

(First Modified Example)

Figure 14:
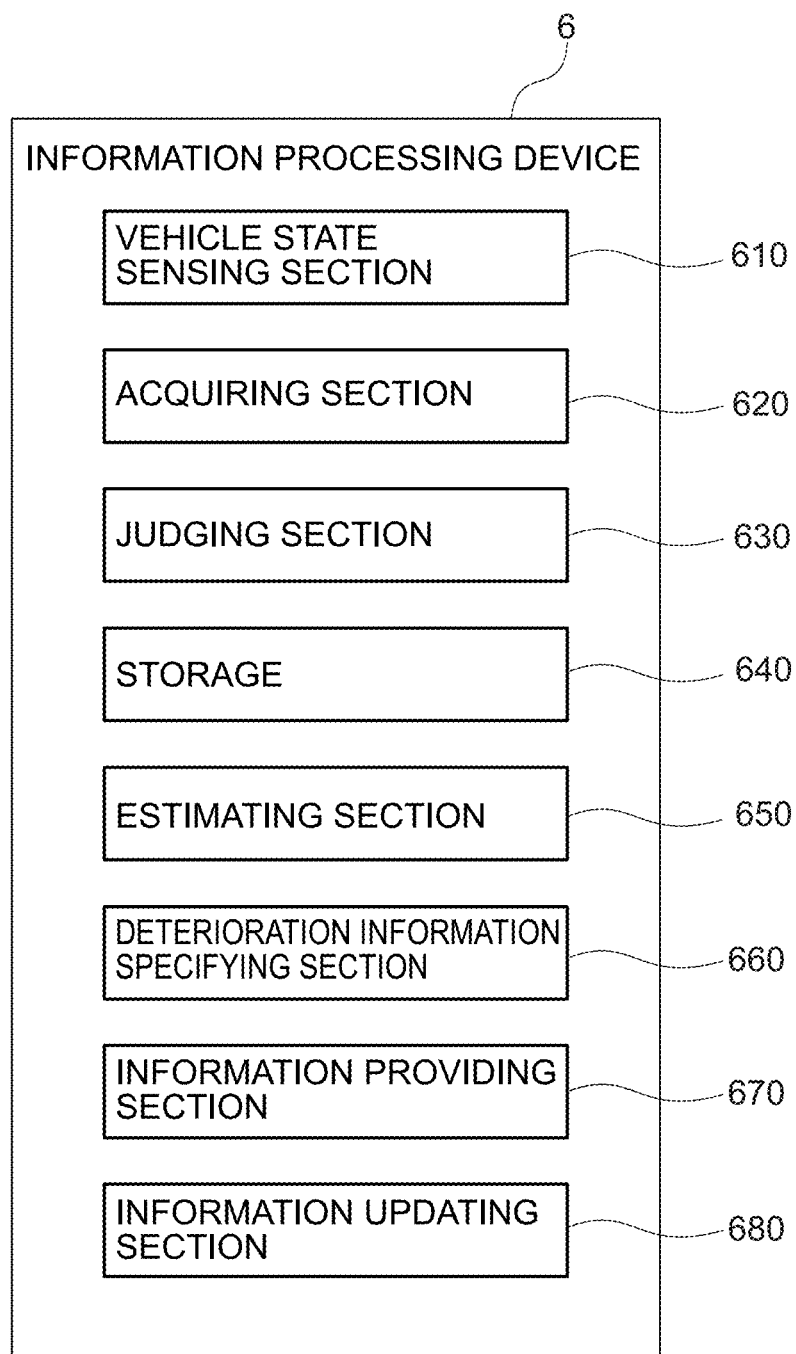
FIG. 14 is a block drawing showing functional structures of an information processing device relating to a modified example of the present embodiment.

In the present embodiment, there is a structure in which the information transmitted from the vehicle 2 is received at the information processing device 3, and the information processing device 3 estimates the deterioration degrees of parts provided within the cabin of the vehicle 2. However, the present disclosure is not limited to this. An information processing device 6 that is shown in FIG. 14 may be installed in the vehicle 2. Note that, at the information processing device 6 that is described hereinafter, structures that are the same as or are equivalent to those of the above-described embodiment are denoted by the same reference numerals.

<Hardware Structures of Information Processing Device>

Because the hardware structures of the information processing device 6 are basically similar to those of the above-described information processing device 20, detailed description thereof is omitted. However, for the hardware structures of the information processing device 6 relating to this modified example, the point that a deterioration information table, a deterioration level table, and a per utilization form correction table are stored in a storage differs from the above-described embodiment. The deterioration information database, deterioration level table, and per utilization form correction table of the information processing device 6 correspond to the structures of the deterioration information database 34A, the deterioration level table 34B and the per utilization form correction table 34C of the information processing device 3.

<Functional Structures of Information Processing Device>
As shown in FIG. 14, the information processing device 6 has a vehicle state sensing section 610, an acquiring section 620, a judging section 630, a storage 640, an estimating section 650, a deterioration information specifying section 660, an information providing section 670 and an information updating section 680. These respective functional structures are realized by the CPU 21 reading-out an execution program that is stored in the ROM 22, and executing the program. Note that, because the respective functional structures of the vehicle state sensing section 610, the acquiring section 620, the judging section 630, the storage 640, the estimating section 650, the deterioration information specifying section 660, the information providing section 670 and the information updating section 680 are similar to the respective structures of the above-described vehicle state sensing section 210, acquiring section 220, judging section 230, storage 320, estimating section 330, deterioration information specifying section 340, information providing section 350 and information updating section 360, description thereof is omitted.

(Second Modified Example)
Further, although not illustrated, in the information processing devices 3, 6 of the present embodiment and the above-described first modified example, the deterioration degrees of the parts provided within the cabin of the vehicle 2 are estimated, but the present disclosure is not limited to this. For example, the deterioration degrees of the parts that structure outer panels of the vehicle 2 may be estimated by control of the information processing device.

Depending on the environment in which the vehicle is stored or the geographical region in which the vehicle is driven, there are cases in which the extents of deterioration of parts that structure outer panels of the vehicles 2 differ greatly, even at vehicles that have been used for the same period of time. Accordingly, in order to appropriately judge the deterioration degrees of parts that structure outer panels, it is desirable to be able to effectively reference information that is involved in the deterioration of the respective parts.

An information processing device 7 relating to a second modified example of the present embodiment has, as means for solving the above-described problem, a receiving section, a storage and an estimating section, as the functional structures thereof. The receiving section may communicate with a vehicle and receive deterioration information that is involved in the deterioration of a part that structures an outer panel of the vehicle, and the storage may store the deterioration information that was received by the receiving section, and, on the basis of the stored deterioration information, the estimating section may estimate the deterioration degree of the part. The receiving section, the storage and the estimating section are similar to the structures of the receiving section 310, the storage 320 and the estimating section 330 of the information processing device 3 relating to the above-described embodiment. Further, the hardware structures of the information processing device 7 are similar to the hardware structures of the information processing device 3.

In the information processing device 7 relating to this second modified example, the storage may store deterioration items that are set in accordance with parts, and received deterioration information, in correspondence with one another in a deterioration information database. Further, the deterioration information may be structured so as to include environment information such as sunlight, ultraviolet light, rain, snow, pollen and the like, and operation information that specifies the geographical region in which the vehicle travels, and damage information that specifies damage to the outer panels of the vehicle, which information are specified on the basis of weather information of the vehicle periphery or sensors that are installed in the vehicle. Further, the deterioration items of the deterioration information database may include at least one item relating to sun bleaching, rust, dirtying and damage. For example, the deterioration degree that is due to sun bleaching of the outer panels may be estimated in accordance with the deterioration information relating to sunlight or ultraviolet light. Further, in a case in which the operation information of the vehicle specifies that the vehicle is traveling in a coastal region or a region in which salt is scattered in order to melt snow, that may be stored as deterioration information, and the deterioration degree due to rust of the outer panels may be estimated. Further, in a case in which images of a camera such as a drive recorder or the like that captures images of the periphery of the vehicle are analyzed, and dirtying and damage of the outer panels is specified, that may be stored as deterioration information, and the deterioration degree due to dirtying or damage of the outer panels may be estimated.

The information processing device 7 relating to the second modified example may be structured to have a deterioration specifying section and an information updating section that correspond to the deterioration information specifying section 340 and the information updating section 360 relating to the above-described embodiment.

Figure 12:
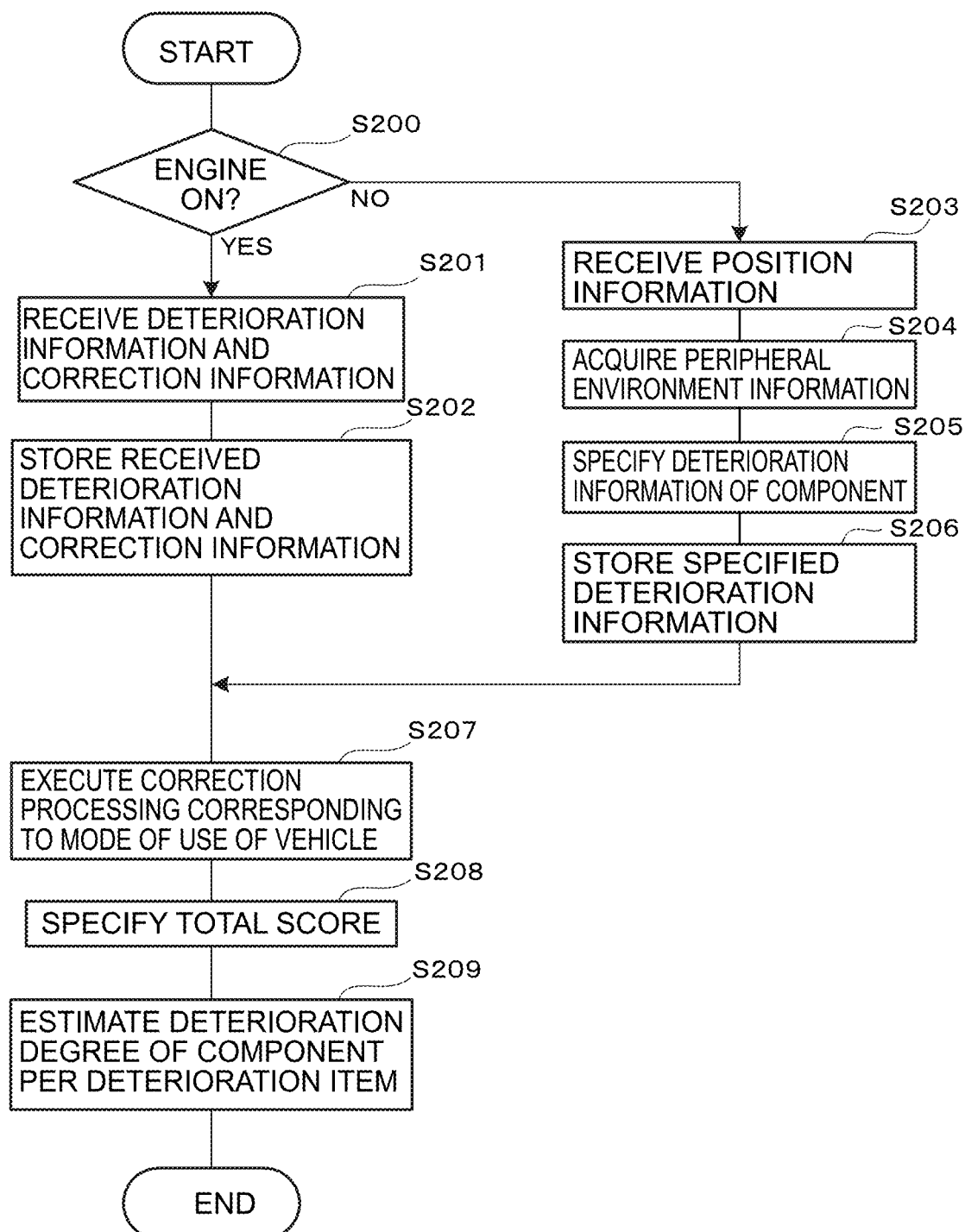
FIG. 12 is an example of a flowchart relating to deterioration degree estimating processing.

Note that, in this second modified example as well, in the same way as in the above-described embodiment, the information acquiring processing that is shown in FIG. 11 can be executed at the information processing device 20 that is installed in the vehicle 2, and the deterioration degree estimating processing and the information updating processing that are shown in FIG. 12 and FIG. 13 can be executed by the information processing device 7.

[Supplemental Explanation]
Note that any of various types of processors other than a CPU may execute the information acquiring processing, the deterioration degree estimating processing and the information updating processing that are executed by the CPU reading-in software (programs) in the above-described respective embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the information acquiring processing, the deterioration degree estimating processing and the information updating processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above respective embodiments describe aspects in which programs of the information acquiring processing, the deterioration degree estimating processing and the information updating processing are stored in advance (are installed) in a ROM or a storage, but the present disclosure is not limited to this. The programs may be provided in a form of being recorded on a recording medium such as a CD-ROM (Compact Disk Read Only Memory), a DVD-ROM (Digital Versatile Disk Read Only Memory), a USB (Universal Serial Bus) memory, or the like. Further, the programs may be in forms of being downloaded from an external device via a network.

What is claimed is:

1. An information processing device, comprising:
at least one processor, wherein the at least one processor is configured to:
communicate with a vehicle and receive deterioration information concerning deterioration of a component provided inside a cabin of the vehicle;
store the received deterioration information and a deterioration item, which is set in relation to the component, in association with one another, wherein the deterioration item includes at least one item relating to a decrease in elasticity, sun bleaching, or; and
estimate a degree of deterioration of the component based on the stored deterioration information.

2. The information processing device of claim 1, wherein the at least one processor is configured to correct the degree of deterioration of the component in accordance with a mode of use of the vehicle.

3. The information processing device of claim 2, wherein the mode of use includes at least
a mode in which the vehicle is utilized for household use and
a mode in which the vehicle is utilized for business use.

4. The information processing device of claim 1, wherein the at least one processor is further configured to
judge whether or not an engine of the vehicle is in an on state;
in response to judging that the engine is in the on state,
receive the deterioration information and correction information, wherein the correction information includes at least one of
body information relating to a body of a vehicle occupant,
emotion information relating to an emotion of the vehicle occupant,
clothing information relating to clothing of the vehicle occupant, or
deterioration suppression information that comprises behavior of the vehicle occupant and concerns suppression of deterioration of the component, and
store the received deterioration information and the correction information;
in response to judging that the engine is not in the on state,
receive position information of the vehicle through Global Positioning System (GPS),
acquire a periphery information based on the received position information, wherein the periphery information is related to an environment of a periphery of the vehicle,
specify the deterioration information based on the periphery information, and
store the specified deterioration information based on the periphery information;
execute correction processing to correct the degree of deterioration of the component in accordance with a mode of use of the vehicle;
specify a score corresponding to the deterioration item; and
estimate the degree of deterioration of the component per the deterioration item.

5. The information processing device of claim 4, wherein the periphery information includes at least one of weather information, ultraviolet light information, map data, or satellite image data.

6. The information processing device of claim 1, wherein the deterioration information is information relating to the vehicle, and includes at least one of
in-cabin environment information relating to an environment within the cabin or
usage information relating to the component.

7. The information processing device of claim 1, wherein the deterioration information is information relating to an occupant of the vehicle, and includes behavior information relating to behavior of the occupant of the vehicle.

8. The information processing device of claim 1, wherein:
the at least one processor is configured to
receive correction information that includes at least one of
body information relating to a body of a vehicle occupant,
emotion information relating to an emotion of the vehicle occupant,
clothing information relating to clothing of the vehicle occupant, or
deterioration suppression information that comprises behavior of the vehicle occupant and concerns suppression of deterioration of the component, and
in response to receiving the correction information, estimate the degree of deterioration of the component based on the deterioration information and the correction information.

9. The information processing device of claim 1, wherein the at least one processor is configured to:
in response to the deterioration information being not received from the vehicle, receive position information for the vehicle, and
based on the received position information, acquire periphery information relating to an environment of a periphery of the vehicle, and, based on the periphery information, specify the deterioration information of the component.

10. The information processing device of claim 1, wherein
the at least one processor is configured to:
receive inspection information for the vehicle,
compare a degree of deterioration of the component in received inspection information and an estimated degree of deterioration of the component, and
in response to that the respective degrees of deterioration differ, update the degree of deterioration of the component to the degree of deterioration of the inspection information.

11. An information processing method, comprising:
communicating with a vehicle and receiving deterioration information concerning deterioration of a component provided inside a cabin of the vehicle;

storing the received deterioration information and a deterioration item, which is set in relation to the component, in association with one another, wherein
the deterioration item includes at least one item relating to a decrease in elasticity, sun bleaching, or; and
estimating a degree of deterioration of the component based on the stored deterioration information.

12. The information processing method of claim 11, further comprising:
judging whether or not an engine of the vehicle is in an on state;
in response to judging that the engine is in the on state,
receiving the deterioration information and correction information, wherein the correction information includes at least one of
body information relating to a body of a vehicle occupant,
emotion information relating to an emotion of the vehicle occupant,
clothing information relating to clothing of the vehicle occupant, or
deterioration suppression information that comprises behavior of the vehicle occupant and concerns suppression of deterioration of the component, and
storing the received deterioration information and the correction information;
in response to judging that the engine is not in the on state,
receiving position information of the vehicle through Global Positioning System (GPS),
acquiring a periphery information based on the received position information, wherein the periphery information is related to an environment of a periphery of the vehicle,
specifying the deterioration information based on the periphery information, and
storing the specified deterioration information based on the periphery information;
executing correction processing to correct the degree of deterioration of the component in accordance with a mode of use of the vehicle;
specifying a score corresponding to the deterioration item; and
estimating the degree of deterioration of the component per the deterioration item.

13. The information processing method of claim 12, wherein
the periphery information includes at least one of weather information, ultraviolet light information, map data, or satellite image data.

14. A computer-readable, non-transitory storage medium storing a program executable by a processor to perform processing, the processing comprising:
communicating with a vehicle and receiving deterioration information concerning deterioration of a component provided inside a cabin of the vehicle;
storing the received deterioration information and a deterioration item, which is set in relation to the component, in association with one another, wherein
the deterioration item includes at least one item relating to a decrease in elasticity, sun bleaching, or; and
estimating a degree of deterioration of the component based on the stored deterioration information.

15. The computer-readable, non-transitory storage medium of claim 14, wherein the processing further comprises:
judging whether or not an engine of the vehicle is in an on state;
in response to judging that the engine is in the on state,
receiving the deterioration information and correction information, wherein the correction information includes at least one of
body information relating to a body of a vehicle occupant,
emotion information relating to an emotion of the vehicle occupant,
clothing information relating to clothing of the vehicle occupant, or
deterioration suppression information that comprises behavior of the vehicle occupant and concerns suppression of deterioration of the component, and
storing the received deterioration information and the correction information;
in response to judging that the engine is not in the on state,
receiving position information of the vehicle through Global Positioning System (GPS),
acquiring a periphery information based on the received position information, wherein the periphery information is related to an environment of a periphery of the vehicle,
specifying the deterioration information based on the periphery information, and
storing the specified deterioration information based on the periphery information;
executing correction processing to correct the degree of deterioration of the component in accordance with a mode of use of the vehicle;
specifying a score corresponding to the deterioration item; and
estimating the degree of deterioration of the component per the deterioration item.

16. The computer-readable, non-transitory storage medium of claim 15, wherein
the periphery information includes at least one of weather information, ultraviolet light information, map data, or satellite image data.

17. An information processing system configured such that vehicles, an information processing device, a vehicle maintenance/repair business terminal, and a used vehicle sales business terminal are communicable via a network, the information processing device comprising:
a receiving section configured to
communicate with a vehicle, and
receive deterioration information concerning deterioration of a component provided inside a cabin of the vehicle;
a storage section storing the deterioration information received by the receiving section and a deterioration item, which is set in relation to the component, in association with one another, wherein
the deterioration item includes at least one item relating to a decrease in elasticity, sun bleaching, or;
an estimating section configured to estimate a degree of deterioration of the component based on the deterioration information stored in the storage section; and
a transmitting section configured to transmit the estimated degree of deterioration of the component to the vehicle maintenance/repair business terminal or the used vehicle sales business terminal.

18. The information processing system of claim 17, wherein
   the information processing device is configured to judge whether or not an engine of the vehicle is in an on state;
   the receiving section is further configured to, in response to the engine being judged in the on state, receive the deterioration information and correction information, wherein the correction information includes at least one of
      body information relating to a body of a vehicle occupant,
      emotion information relating to an emotion of the vehicle occupant,
      clothing information relating to clothing of the vehicle occupant, or
      deterioration suppression information that comprises behavior of the vehicle occupant and concerns suppression of deterioration of the component;
   the storage section stores the received deterioration information and the correction information;
   the receiving section is further configured to, in response to the engine being judged not in the on state, receive position information of the vehicle through Global Positioning System (GPS);
   the information processing device further comprises a deterioration information specifying section configured to
      acquire a periphery information based on the received position information, wherein the periphery information is related to an environment of a periphery of the vehicle, and
      specify the deterioration information based on the periphery information;
   the storage section stores the specified deterioration information based on the periphery information; and
   the estimating section is configured to
      execute correction processing to correct the degree of deterioration of the component in accordance with a mode of use of the vehicle,
      specify a score corresponding to the deterioration item, and
      estimate the degree of deterioration of the component per the deterioration item.

19. The information processing system of claim 18, wherein
   the periphery information includes at least one of weather information, ultraviolet light information, map data, or satellite image data.

* * * * *